Aug. 31, 1965
R. V. JACKSON
3,204,173
ARC WELDER LOAD CONTROL
Filed July 26, 1962
2 Sheets-Sheet 1
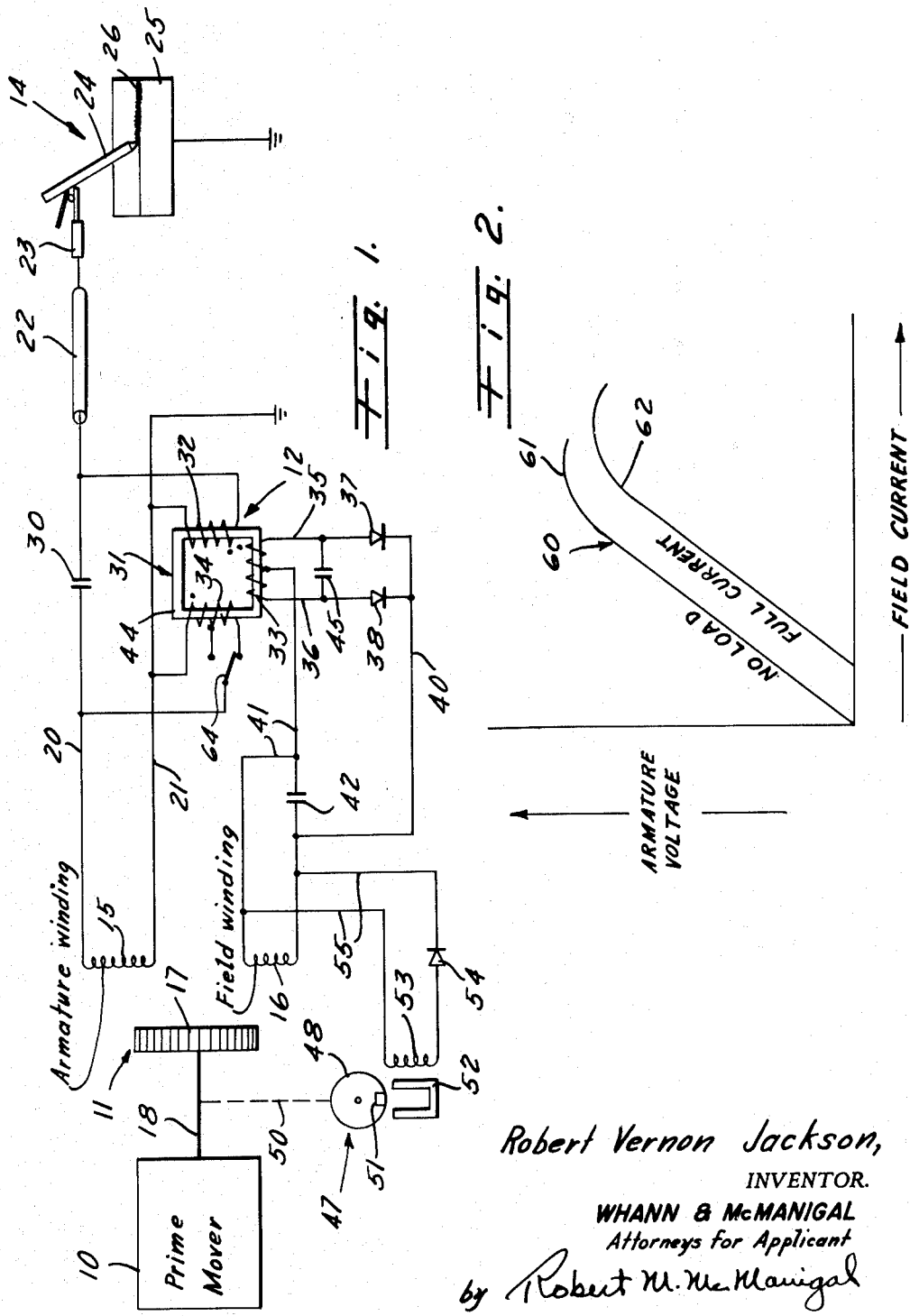
Robert Vernon Jackson,
INVENTOR.
WHANN & McMANIGAL
Attorneys for Applicant
by Robert M. McManigal Aug. 31, 1965

R. V. JACKSON 3,204,173

ARC WELDER LOAD CONTROL

Filed July 26, 1962

Robert Vernon Jackson,
INVENTOR.
WHANN & McMANIGAL
Attorneys for Applicant
by Robert M. McManigal United States Patent Office 3,204,173
Patented Aug. 31, 1965

3,204,173
ARC WELDER LOAD CONTROL
Robert Vernon Jackson, Los Angeles, Calif., assignor to McCulloch Corporation, Los Angeles, Calif., a corporation of Wisconsin
Filed July 26, 1962, Ser. No. 212,558
23 Claims. (Cl. 322—28)

This invention relates generally to arc welders including an inductor alternator and particularly relates to a control system for maintaining a predetermined relation between the output voltage of such arc welder alternator and variations of its load.

The inductor alternator and its control system, in accordance with the present invention, is particularly adapted to be used as a portable arc welder. It will be understood, however, that the control system of the present invention is applicable to any inductor alternator regardless of size.

Arc welders are well known in the art. Most prior art arc welders are relatively heavy and are either used at a fixed location or at the best they can be transported by a heavy truck. It will be obvious, however, that a portable arc welder has many uses. An arc welder which can be carried by hand, including its prime mover, may be used to repair heavy equipment such as is used in construction work. In such cases, due to rugged terrain or lack of access roads, it is frequently not possible to carry a heavy arc welder to the equipment to be welded in a truck. Furthermore, a portable arc welder may be used during the construction of bridges or high buildings. For such purposes, a portable arc welder has many advantages. It makes it unnecessary to provide a long cable which is expensive and heavy and which generally dissipates an appreciable portion of the alternator output power.

An arc welder which is truly portable requires both a small and light-weight prime mover as well as a light-weight alternator. The prime mover, for example, may consist of a small internal combustion engine. Such a combustion engine may be a two-cycle engine of the type frequently used for small power applications such as portable saws or outboard motors. An inductor alternator can, of course, be designed to be small in weight. However, the combination of a small internal combustion engine with a light weight alternator requires a special control to prevent the output voltage across the load from varying widely with variations of the load. Particularly, during arc welding, there is a widely varying demand on the alternator. Therefore, an electronic control system which will substantially instantaneously adjust the alternator output power in accordance with variations of the load is a necessity.

Furthermore, it is highly desirable that the alternator be self-starting. In other words, it is important that the alternator can be started without requiring a battery or some other outside source of electric power.

Finally, the control system of the present invention for an inductor alternator may be designed in such a manner that the voltage across the load remains substantially constant regardless of varying load demands. On the other hand, it is also possible to design the control system in such a manner that it is either over- or under-compounding. In other words, the control system may be designed so that the voltage across the load, that is, the output voltage of the alternator system increases with an increase of the load. This is called over-compounding. On the other hand, it is also possible to design the control system in such a manner that the compensation of the voltage drop across the load, caused by an increase of the load is only partial and this is called under-compounding.

It is accordingly an object of the present invention to provide a control system for a light weight inductor alternator and prime mover suitable, for example, as a portable arc welder.

Another object of the invention is to provide a control system for an inductor alternator which perimts over-compounding, under-compounding, or exact compensation of the output or load voltage with variations in the load impedance.

A further object of the invention is to provide an inductor alternator control system which is voltage responsive and requires little power for its operation.

Still another object of the present invention is to provide a control system for a light weight inductor alternator which is self-exciting and hence requires no batteries or other external power source for starting the alternator.

Still a further object of the present invention is to provide a control system for an inductor alternator which is substantially instantaneous in its control action so that voltage variations across the load which are caused by the varying load demands are rapidly compensated for.

In accordance with the present invention, there is provided a control system for regulating the output voltage of an inductor alternator under varying load conditions. The inductor alternator is of the type having an armature winding and a field winding. A compensating capacitor is connected in series between the armature winding and the load. Preferably, the reactance of the compensating capacitor at the operating frequency of the alternator is not greater than the reactance of the armature winding at the operating frequency. As a result, the load, connected to the alternator, sees either a small inductive impedance or a purely resistive impedance. In other words, if the two reactances are exactly the same, the load sees only a resistive source. On the other hand, if the reactance of the armature winding is larger than the reactance of the capacitor the load sees a small inductive source.

In order to effect the desired control of the alternator output voltage, impedance means such as an inductor or transformer is connected across either the armature winding or the series compensating capacitor. In other words, the inductor is connected across one of the two reactance elements connected in series with the load, and this inductor is responsive to variations of the voltage across the element to which it is coupled. This inductor, in turn, is coupled to a feedback circuit provided between the inductor and field winding. The feedback circuit includes rectifier means such as a full wave rectifier for impressing on the field winding a direct current which increases with an increase of the load.

As will be shown subsequently, by a proper design of the control system and by a proper choice of the reactance of the compensating capacitor, the control system may be designed to provide under-compounding, over-compounding or a complete compensation of the load voltage in spite of varying load demands.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a circuit diagram and schematic representation of an arc welder including a prime mover, an inductor alternator and its control system embodying the present invention;

FIG. 2 is a chart plotting armature voltage as a function of field current for an inductor alternator and which will be referred to in explaining the operation of the circuit of FIG. 1;

Figure 3:
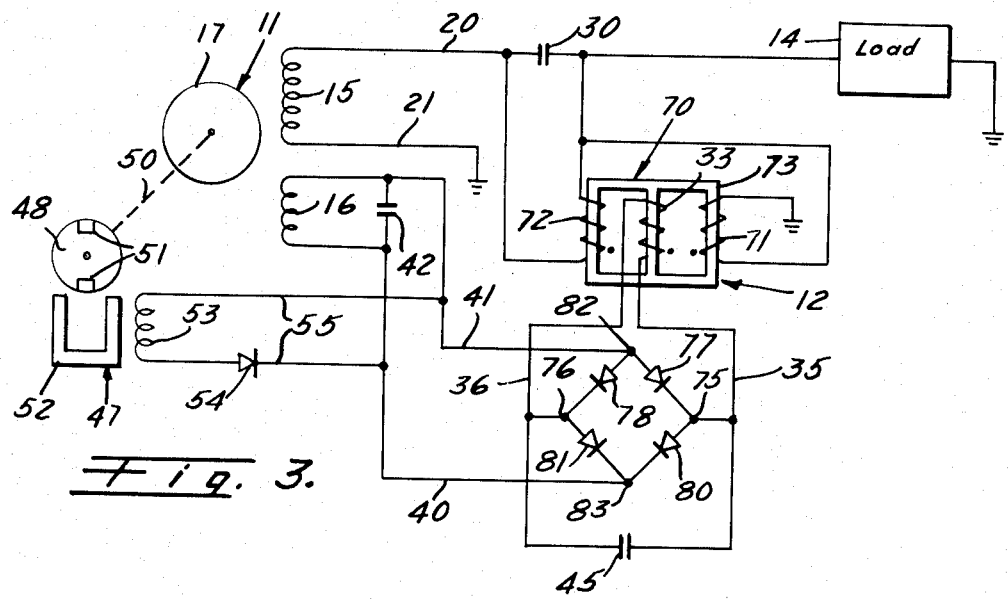
FIG. 3 is a circuit diagram of a modified alternator control system in accordance with the invention.

Referring now to the drawings, wherein like elements are designated by the same reference characters, and particularly to FIG. 1, there is illustrated schematically an arc welder embodying the present invention. The arc welder of FIG. 1 generally includes a prime mover schematically indicated at 10, an inductor alternator shown at 11, a control circuit indicated at 12, and an output load, here shown as a welder 14. The prime mover 10 preferably consists of an internal combustion engine such as a two-cycle, high speed and small weight engine. However, it is to be understood that any prime mover may be utilized with the control system of the present invention.

The alternator 11 is of the inductor alternator type and includes an armature winding 15 and a field winding 16 disposed in the magnetic field of the alternator 11. The rotor 17 is driven by the prime mover 10 through a shaft schematically indicated at 18. Leads 20 and 21 are connected across the terminals of the armature winding 15 and and provide the output circuit for the alternator 11. Output lead 21 may be grounded as shown while the other output lead 20 may be connected to a heavy-duty cable 22 of suitable length. Preferably, the cable 22 has a litz wire to minimize eddy current losses at the operating frequency of the alternator. By way of example, the alternator may be operated at a frequency of 2,880 cycles per second (c.p.s.). The output cable 22 may be connected to a handle and electrode holder 23 for holding a suitable welding rod 24. A work piece 25 to be welded, may be grounded as shown. As illustrated in FIG. 1, a weld 26 has just been made by the welding rod 24.

The control system 12 of the present invention, is responsive to voltage variations caused by varying load demands, that is, by varying load impedance. For example, in the arc welder of FIG. 1, the load will vary as the welding operator increases or decreases the size of the welding arc. The variation of the output load or output impedance will cause voltage variations in the system which are utilized in accordance with the present invention to compensate for the decrease of the voltage across the output load in response to an increase of the load demand. This voltage developed in the control system 12 is then rectified and impressed on the field winding 16 as a direct current to increase the output voltage of the armature winding 15 to compensate for an increase of the load. The control system 12 of the present invention provides for substantially instantaneous compensation without substantial time lag.

In accordance with the present invention a series compensating capacitor 30 is connected serially between the armature winding 15 and the output load 14. As shown in FIG. 1, the compensating capacitor 30 is connected in the output lead 20. The reactance of compensating capacitor 30 preferably either equals the reactance of the armature winding 15 at the operating frequency of the alternator or is less than the reactance of the armature winding. If the reactances of compensating capacitor 30 and the armature winding 15 are equal at the operating frequency, the output load 14 sees a resistive impedance. On the other hand, if the reactance of compensating capacitor 30 is less than that of the armature winding 15 the output load 14 sees a source having a small inductive reactance. As will be more fully described hereinafter, the reactance of compensating capacitor 30 and its relation to that of the armature winding 15 and the proper design of the control system 12 makes it possible to over-compound or under-compound or to exactly compensate the output voltage variations with variations in load demand.

The control system 12 includes a transformer 31 having a first winding 32 which is connected directly between output leads 20 and 21, that is, the winding 32 is connected across the output load 14. The transformer 31 also includes a second winding 33 as well as a third winding 34. The third winding 34 is directly connected across the armature winding 15. For convenience, winding 32 may be referred to as a primary winding and winding 33 as the secondary winding, while the transformer winding 34 may be designated the tertiary winding. It will thus be seen that the primary winding 32 is responsive to variations of the voltage across the load 14. The tertiary winding 34 is responsive to variations of the voltage across the armature winding 15. It should be noted that the impedances of the windings 32 and 34 are relatively large and therefore the primary and tertiary windings are essentially responsive to voltage rather than to current.

The secondary winding 33 is coupled to a feedback circuit connected between the secondary winding and the field winding 16. The feedback circuit includes a full wave rectifier as will now be explained. Leads 35 and 36 are connected to the terminals of secondary winding 33. The output leads 35 and 36 are connected to a lead 40 through two rectifiers 37 and 38 which are poled in such a manner as shown as to serve as a full wave rectifier. The lead 40 is connected to one of the terminals of the field winding 16. The other terminal of the field winding 16 is connected to lead 41 which in turn is connected to the midpoint of the secondary winding 33. A conventional filter capacitor 42 is connected between the leads 40 and 41. Thus, the filter capacitor 42 is connected across the field winding 16. Accordingly, the two rectifiers 37, 38 and the filter capacitor 42 form a full wave rectifier and filter network to apply a direct current to the field winding 16.

The three control windings 32, 33 and 34 may be wound on any conventional transformer core. However, as illustrated in FIG. 1, there is provided a conventional U-core 44 and the three windings 32, 33 and 34 are wound around three adjacent legs of the U-core. Preferably, the transformer core 44 is laminated to minimize eddy current losses.

Preferably, a capacitor 45 is connected across the output leads 35, 36, that is, across the secondary winding 33. The secondary winding 33 and the capacitor 45 thus form a parallel resonant circuit. This parallel resonant circuit 33, 45 is preferably tuned to have a resonant frequency below the operating frequency of the alternator. Thus, the capacitor 45 may be considered as a load impedance for the full wave rectifier circuit. Furthermore, the capacitor 45 operates as a suppressor of transients which may occur in the control transformer 31. The time constant of the transient suppressor 33, 45 corresponds to the resonant frequency of the tuned circuit.

The inductor alternator may be provided with an auxiliary generator indicated at 47 for starting the alternator. However, the auxiliary generator 47 is optional and may be omitted as will become more evident hereinafter.

The auxiliary generator 47 includes a disc 48 coupled as shown at 50 to the output shaft 18 of the prime mover. The disc 48 may be provided, for example, with one permanent magnet 51 disposed about its periphery. Alternatively, two or more permanent magnets may be utilized. Preferably, the disc 48 and permanent magnet 51 are made integral with the alternator rotor 17. However, in that case, the disc 48 and magnet 51 should be provided outside the active magnetic circuit of the alternator. The auxiliary generator further includes an external magnetic circuit which may consist of a U-shaped or E-shaped core or pick-up 52 disposed adjacent the permanent magnet 51, and further includes a generator winding 53. A rectifier 54 is connected to one of the output terminals of the winding 53.

As a result, as the disc 48 rotates the magnet 51 will rotate periodically past the fixed core 52. Every time the rotating magnet 51 passes the fixed core 52 the flux through the winding 53 varies to generate a voltage which may then be rectified by the rectifier 54. By means of leads 55, the winding 53 may be connected across the field winding 16. Hence, the field winding 16 is supplied with a rectified current as soon as the prime mover 10 begins to rotate.

The operation of the arc welder and its control system of FIG. 1 will now be explained. The inductor alternator 11 may be started by self-excitation. Thus, assuming that there is sufficient magnetic remanence in the inductor alternator 11, self-excitation is possible in the following manner.

The residual magnetism of the alternator will produce a certain armature voltage across the armature winding 15 when the prime mover 10 begins to rotate the alternator. As long as the load 14 is open-circuited the voltage across the primary winding 32 is substantially equal to the output voltage across the armature winding 15. Hence, the voltage across the armature winding 15 also appears across the primary winding 32. This voltage is then impressed on the secondary winding 33 and rectified by the full wave rectifier 37, 38 and filtered by the filter capacitor 42. Consequently, a circuit current is impressed on the field winding 16.

The voltage across the secondary winding 33 quickly reaches a value greater than the combined losses of the forward voltage drop across the two rectifiers 37, 38, the leakage loss of the filter capacitor 42 and the excitation requirement of the field magnetic circuit. This will be true provided the inductor alternator 11 has sufficient magnetic remanence.

Thus, assuming that the voltage across the secondary winding 33, exceeds the various circuit losses as explained hereinabove, the control circuit becomes regenerative. As a result, the current impressed on the field winding 16 continues to increase resulting in a corresponding increase of the voltage across the armature winding 15. This rise of the voltage across the armature winding 15 continues until further increase of the field current causes a decrease of the armature voltage.

This has been illustrated in FIG. 2, to which reference is now made. Thus, curve 60 of FIG. 2 shows a typical relationship of the armature voltage as a function of field current for an inductor alternator. Curve 60 illustrates the conditions without a load, that is, with the output circuit open. It will be noted that there is a substantial linear relationship between the increase of the field current and the resulting increase of the armature voltage until a bend or knee 61 of the curve 60 is reached. Curve 62 shows the relationship between field current and armature voltage for full load current. It will be noted that the two curves 60 and 62 are similar, both having a knee and both showing that the armature voltage eventually decreases with further increase of the field current. Thus, it will be apparent that the above described regenerative circuit cannot cause destruction of the alternator and will not increase the armature voltage beyond a certain maximum value.

As long as the magnetic remanence of the inductor alternator is sufficient to provide the regenerative feedback current for the field winding, the auxiliary generator 47 is not required and may be omitted. This is particularly true of the larger type alternator. However, for a small, light weight alternator the residual magnetism of the alternator may be insufficient to maintain the regenerative circuit above described. In such case, the auxiliary generator 47 may be needed and its operation will now be described.

As explained before, upon rotation of the prime mover 10 the disc 48 also will be rotated through shafts 18 and 50 so that the permanent magnet 51 rotates past the fixed core 52. The resulting flux variation will generate a voltage across the coil 53. This voltage may take the form of a voltage pulse every time the magnet 51 rotates past the fixed core 52. As explained hereinbefore, two or more magnets 51 may be utilized to provide a higher duty cycle. The resulting voltage peaks are then rectified by the rectifier 54 to apply a rectified current across the field winding 16. The windings of the generator coil 53 are such that enough power is generated to overcome the circuit losses and provide for self-excitation. These circuit losses have previously been explained. In this manner the voltage across the armature winding 15 is increased until the control system 12 can take over.

As already explained, in the absence of a load, the output voltage across the armature winding 15 also appears across the primary winding 32 of the control transformer 31. This voltage is then impressed upon the secondary winding 32 and is rectified and applied to the field winding 16. Accordingly, the field current is increased until further increase of the field current will no longer cause an increase of the armature voltage, as depicted by curve 60. Therefore, the field current remains at a value to provide substantially maximum armature voltage until a load is connected to the alternator. It will also be understood that if the speed of the prime mover 10 varies, this in turn will vary the speed of the alternator 11. As a result, the frequency of the alternating current developed across the armature winding 15 will also vary and may require a rebalancing of the system which is effected by the control system in the manner previously described.

It may also be noted that as soon as the voltage across the leads 40 and 41 developed by the control system 12 exceeds the voltage developed across the generator coil 53, the rectifier 54 will be blocked. As a result, the generator 47 is effectively disconnected from the system because the rectifier 54 now represents an open switch. Therefore, the generator 47 no longer has any effect upon the alternator. Of course, if the output voltage across leads 40, 41 delivered by the control system 12 falls again below the voltage across the generator coil 53, the rectifier 54 becomes unblocked and the generator 47 is again enabled to supply field current to the field winding 16.

After the inductor alternator 11 has been self-excited, as previously explained, it is maintained through the control system 12. Thus, the secondary winding 33 is responsive both to the voltage across the output load 14 through primary winding 32 as well as to the voltage across the armature winding 15 through tertiary winding 34. The transformer 31 is so poled and the turns ratio is such that sufficient field current is developed to maintain the alternator excited in the absence of any load. Preferably, the primary winding 32 and the tertiary winding 34 are connected in bucking relation. In other words, the primary winding 32 and the tertiary winding 34 are connected in series opposition. Furthermore, the turns ratio of the three windings, 32 to 34, and the poling of the three windings is such as to obtain the desired amount of compensation. Therefore, it is also feasible to connect the two windings 32 and 34 in series-aiding relation provided the proper turns ratio is used.

Assuming now that the load 14 is connected to the inductor alternator 11 and that the load demand increases or the load impedance decreases. As a result, the voltage across the armature winding 15 tends to rise while the load current rises. On the other hand, the voltage across the load 14 tends to decrease. Accordingly, the voltage across the compensating capacitor 30 also increases. As long as no load is connected to the alternator there is no voltage drop across the compensating capacitor 30. It will therefore be obvious that it is possible to utilize the increase of the voltage across either the armature winding 15 or across the compensating capacitor 30 for effecting a control of the field current. In the embodiment of the invention illustrated in FIG. 1, use is made of the voltage variation both across the armature winding 15 and the output load 14.

In any case, the control transformer 31 is so designed that upon a decrease of the load impedance and a resulting increase of the voltage across the tertiary winding 34 and a simultaneous decrease of the voltage across the primary winding 32, the voltage across the secondary winding 33 increases. This in turn will result in a larger field current being supplied to the field winding 16. As a result, the voltage across the load 14 increases to compensate for the decrease of the load impedance.

Over-compounding, under-compounding or an exact compensation of the output load voltage can be effected by the proper design of the control transformer 31, the turns ratio of its windings 32 to 34 and the proper poling of the three windings. The degree of compounding may, for example, be varied by the provision of a switch 64 for tapping turns of the tertiary winding 34. Thus, when the switch 64 is closed the tertiary winding 34 has fewer effective turns thereby changing the relationship between variations of the load impedance and variations of the load voltage.

It may also be noted that if a full compensation is desired, the reactances of capacitor 30 and armature winding 15 should be equal at the operating frequency.

Reference is now made to the inductor alternator and control circuit of FIG. 3. The circuit of FIG. 3 is substantially the same as that of FIG. 1 except that the control transformer 70 and its windings differs from the control transformer 31 and that a bridge rectifier is substituted for the full wave rectifiers 37 and 38 of FIG. 1. The control transformer 70 again has a primary winding 71 which is connected across the output load 14. In other words, the primary winding 71 is connected between the output lead 20 and ground. The secondary winding 33 is again the same as that of FIG. 1, while a tertiary winding 72 is connected across the compensating capacitor 30. The control transformer 70 preferably has a core 73 which is a so-called E-I core which is preferably laminated to minimize eddy current losses. The three windings 71, 33 and 72 are wound about the three vertical legs of the E-I core 73. The output leads 35, 36 of the secondary winding 33 are connected to the two opposite terminals 75 and 76 of a bridge rectifier including four rectifiers 77, 78, 80 and 81. The other two terminals 82 and 83 of the bridge rectifier network are connected to the leads 40 and 41 which in turn are connected across the field winding 16. It will be noted that the two windings 71 and 72 are effectively connected in series across the armature winding 15.

The bridge rectifier network operates in a conventional manner. Assuming, for example, that at one instant the lead 35 is positive with respect to lead 36. In that case, current flows from lead 35 through rectifier 80, terminal 83, lead 40 through field winding 16 and back through lead 41, rectifier 78 into lead 36 and through the secondary winding 33. Assuming that at some other time, the lead 36 is positive with respect to the lead 35. In that case, the current flow can be traced from lead 36, rectifier 81, terminal 83, lead 40, field winding 16, lead 41, rectifier 77 and back to lead 35 and secondary winding 33.

The alternator of FIG. 3 may be self-excited by the magnetic remanence of the alternator or else by the auxiliary generator 47 in the manner previously described.

As explained hereinbefore, when the load 14 is connected across the alternator output and when the load impedance decreases, the voltage across the armature winding 15 increases as well as the voltage across the compensating capacitor 30. On the other hand, the voltage across the load 14 decreases. The windings 71 and 72, that is, the primary and tertiary windings may be arranged in series aiding relationship as shown. The turns ratio should again be chosen in such a manner that an increase of the load demand causes an increase of the voltage across the secondary winding 33 with a resulting increase of the field current.

Since the voltage across the primary winding 71 decreases while the voltage across the tertiary winding 72 increases with a decrease of the load impedance, the turns ratio should be chosen in such a manner that the tertiary winding 72 will cause an increase of the voltage across the secondary winding 33, in spite of the decrease of the voltage across the primary winding 71. It will also be noted that when the output circuit is open, that is, when the load 14 is not connected to the alternator, there is no voltage present on the tertiary winding 72. In that case, there will obviously be no voltage drop across the compensating capacitor 30. Hence, as long as there is no load, the primary winding 71 must furnish all the exciting voltage to the secondary winding 33.

It will also be apparent that the voltage drop across the compensating capacitor 30 which is sensed by the tertiary winding 72, is a function of the load current and of the reactance of the capacitor 30. Thus, again, by a selection of the turns ratio of the control transformer 70, the field current may be made to increase or to decrease or to hold the field current constant in spite of variations of the load impedance. This makes it possible to match the characteristics of a widely and rapidly varying external load to the inductor alternator.

Figure 4:
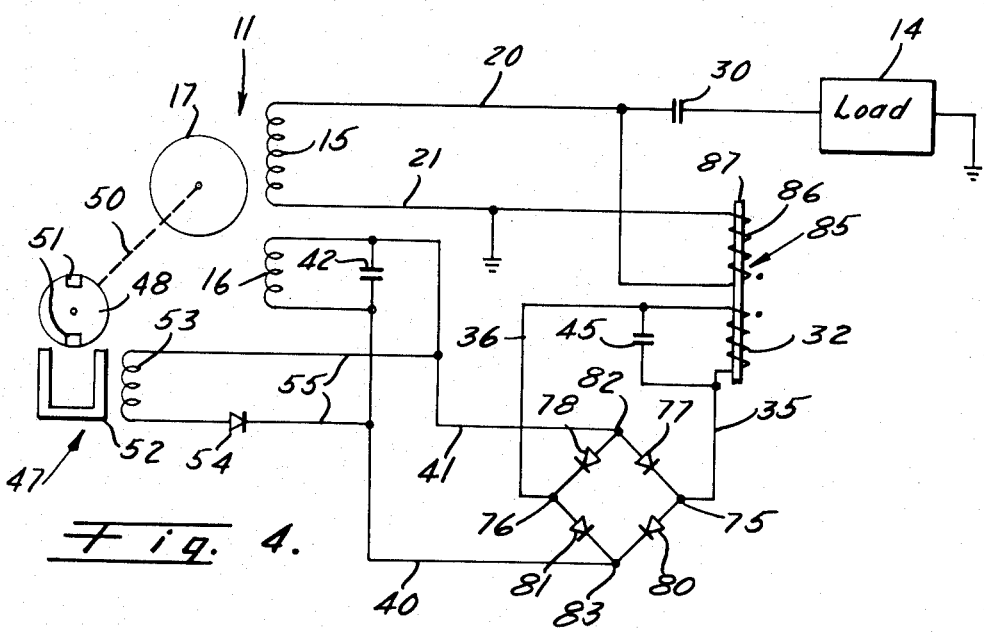
FIG. 4 is a circuit diagram of a preferred inductor alternator control system of the invention.

A preferred inductor alternator control system is illustrated in FIG. 4 to which reference is now made. The circuit of FIG. 4 is essentially the same as that of FIG. 3 except for the control transformer 85. The control transformer 85 includes a primary winding 86 which is connected directly across the armature winding 15. The secondary winding 32 is again the same as that of FIGS. 1 and 3. However, there is no tertiary winding. The transformer core 87 may be a bar-core as illustrated. A bridge rectifier circuit is again connected across the secondary winding 32 as in the embodiment of FIG. 3. Therefore, further description of the operation of the rectifier is not required.

The compensating capacitor 30 preferably has a reactance at the operating frequency which is less than the reactance of the armature winding 15 at the operating frequency. Hence, the system is under-compensated. As the output load 14 decreases in impedance, the load current increases. At the same time as explained hereinbefore, the load voltage decreases while the armature voltage increases. Thus, by a judicious design of the circuit and its control transformer 85 the proper compounding may be obtained. It will be noted again that the primary winding 86 is responsive to voltage variations across the armature winding 15 which is one of the two reactances connected in series with the load. Thus, with a given value of the armature winding 15 the value of the compensating capacitor 30 and the field current determine the armature reactance and thereby the voltage which appears across the armature winding 15 for any load current. Therefore, as long as the reactance of the compensating capacitor 30 is less than the reactance of the armature winding 15, the rising armature voltage with increasing load current will supply the optimum amount of field current through the control transformer and rectifier circuit.

The circuit of FIG. 4 has been utilized as a portable arc welder having a weight of approximately 52 pounds. The internal combustion engine serving as the prime mover contributes about 28 pounds to the weight while the alternator including the control system weighs about 23¾ pounds. The control system including the control transformer, rectifiers, etc., weighs approximately 1¾ pounds.

With an internal combustion engine operating at 7,200 r.p.m., the alternator frequency is 2,880 c.p.s. The frequency of the alternator varies with engine speed but may be maintained within about 10% by the engine governor. The output power is adjustable by adjusting the engine governor and may vary between 40 and 170 amperes. The open circuit voltage is between 60 and 80 volts while the voltage with the load connected varies between 20 and 30 volts. Hence, at 25 volts and 170 amperes, the output power is 4¼ kilowatts. Thus, it may be noted that a high initial voltage is provided which is very desirable for welding purposes. While the output frequency may vary somewhat, this is of no importance for arc welding. On the other hand, the output may be varied in accordance with the operator demand.

It should be noted that while FIG. 1 illustrates a U-core 31 and FIG. 3 shows an E-I core 73 and FIG. 4 illustrates a bar-core 87, any one of these transformer cores may be used in the circuits of FIGS. 1, 3 and 4. For example, the circuit of FIG. 4 may be used with an E-I core in which case the two windings 86 and 32 are preferably wound about the center leg of the core.

While it will be understood that the circuit specifications of the control system of FIG. 4 may vary according to the design of any particular application, the following circuit specifications for a control system are included, by way of example only, suitable for an alternator output-frequency of about 2,880 c.p.s.:

| | |
|---|---|
| Rectifier 54 | 1N538. |
| Rectifiers 77, 78, 80 and 81 | MR-324 (Motorola). |
| Capacitor 30 | 65 microfarads. |
| Capacitor 45 | 0.1 microfarad. |
| Capacitor 42 | 150 microfarads. |
| Armature winding 15 | Four turns of No. 5 American Wire Gage (AWG). |
| Field winding 16 | 280 turns of No. 23 AWG. |
| Generator coil 53 | 500 turns of No. 34 AWG. |
| Primary winding 86 | 80 turns of No. 16 AWG. |
| Secondary winding 32 | 56 turns of No. 16 AWG. |
| Core 87 | E-I laminated core No. 87. |

It will be understood that the above circuit constants are also applicable to the same elements of the circuits of FIGS. 1 and 3 having the same reference characters.

There has thus been disclosed a control system for an inductor alternator which permits substantially instantaneous compensation of the output voltage in spite of load impedance variations. The inductor alternator can be made to be self-exciting either by the magnetic remanence of the alternator or by the provision of an auxiliary generator. Therefore, the alternator requires no battery or external power supply for excitation. Furthermore, the control system may be made to be under-compounding, over-compounding or may be made to maintain a constant load voltage in spite of load impedance variations. The circuit of FIG. 1 shows, by way of example, an arc welder which is portable. This equipment may also be utilized as a battery charger. In that case, the alternating output voltage may be rectified by a conventional rectifier. The equipment may also be used for inductive heating or as a carbon arc torch for heating purposes. However, it will be understood that the control system of the invention is suitable for any type of inductor alternator regardless of size.

I claim:
1. In an arc welder, the combination comprising:
 (a) a prime mover;
 (b) an inductor alternator having an armature winding and a field winding, said armature winding providing a first reactance element;
 (c) a substantially resistive load;
 (d) a compensating capacitor connected in series between said armature winding and said load, said compensating capacitor providing a second reactance, the reactance of said compensating capacitor at the operating frequency of said alternator being no more than the reactance of said armature winding at said operating frequency;
 (e) a control system for regulating the output voltage of said inductor alternator under varying load impedance conditions and including impedance means connected across one of said reactance elements and responsive to variations of the voltage across said one of said reactance elements;
 (f) a feedback circuit coupled between said impedance means and said field winding; and
 (g) rectifier means included in said feedback circuit for impressing directly on said field winding a direct current which increases with a decrease of the impedance of said load.

2. In an arc welder, the combination comprising:
 (a) a prime mover;
 (b) an inductor alternator having an armature winding and a field winding;
 (c) a substantially resistive load;
 (d) a compensating capacitor connected in series between said armature winding and said load, the reactance of said compensating capacitor at the operating frequency of said alternator being no more than the reactance of said armature winding at said operating frequency;
 (e) a control system for regulating the output voltage of said inductor alternator under varying load impedance conditions and including impedance means connected across said armature winding and responsive to variations of the voltage thereacross;
 (f) a feedback circuit coupled between said impedance means and said field winding; and
 (g) rectifier means included in said feedback circuit for impressing on said field winding a direct current which increases in response to voltage variations across said armature winding with a decrease of the impedance of said load.

3. In an arc welder, the combination comprising:
 (a) a prime mover;
 (b) an inductor alternator having an armature winding and a field winding;
 (c) a substantially resistive load;
 (d) a compensating capacitor connected in series between said armature winding and said load, the reactance of said compensating capacitor at the operating frequency of said alternator being no more than the reactance of said armature winding at said operating frequency;
 (e) a control system for regulating the output voltage of said inductor alternator under varying load impedance conditions and including impedance means connected directly across said compensating capacitor and responsive to variations of the voltage thereacross;
 (f) a feedback circuit coupled between said impedance means and said field winding; and
 (g) rectifier means included in said feedback circuit for impressing on said field winding a direct current which increases with a decrease of the load impedance.

4. In an inductor alternator of the type including an armature winding and a field winding, a control system for regulating the voltages across a substantially resistive load connected to the alternator in spite of load impedance variations, said control system comprising:
 (a) a series compensating capacitor adapted to be connected in series between the armature winding and the load, the reactance of said compensating capacitor at the operating frequency of the alternator being no more than the reactance of the armature winding at said operating frequency;
 (b) impedance means adapted to be connected across the armature winding and responsive to variations of the voltage thereacross;
 (c) a fedback circuit adapted to be coupled between said impedance means and the field winding; and
 (d) rectifier means included in said feedback circuit for impressing on the field winding a direct current which varies in response to voltage variations across the armature winding with a variation of the impedance of the load.

5. A control system for regulating the output voltage of an inductor alternator under varying load impedance conditions comprising:

(a) an inductor alternator having an armature winding and a field winding, said armature winding providing a first reactance element;
(b) a substantially resistive load;
(c) a compensating capacitor connected in series between said armature winding and said load, said compensating capacitor providing a second reactance element, the reactance of said compensating capacitor at the operating frequency of said alternator being no more than the reactance of said armature winding at said operating frequency;
(d) impedance means connected across one of said reactance elements and responsive to variations of the voltage across said one of said reactance elements;
(e) a feedback circuit coupled between said impedance means and said field winding; and
(f) rectifier means included in said feedback circuit for impressing directly on said field winding a direct current which varies with a variation of the impedance of said load.

6. A control system for regulating the output voltage of an inductor alternator under varying load impedance conditions comprising:

(a) an inductor alternator having an armature winding and a field winding;
(b) a substantially resistive load;
(c) a compensating capacitor connected in series between said armature winding and said load, the reactance of said compensating capacitor at the operating frequency of said alternator being no more than the reactance of said armature winding at said operating frequency;
(d) impedance means connected across said armature winding and responsive to variations of the voltage thereacross;
(e) a feedback circuit coupled between said impedance means and said field winding; and
(f) rectifier means included in said feedback circuit for impressing on said field winding a direct current which increases in response to voltage variations across said armature winding with a decrease of the impedance of said load.

7. A control system for regulating the output voltage of an inductor alternator under varying load impedance conditions comprising:

(a) an inductor alternator having an armature winding and a field winding;
(b) a load;
(c) a compensating capacitor connected in series between said armature winding and said load, the reactance of said compensating capacitor at the operating frequency of said alternator being no more than the reactance of said armature winding at said operating frequency;
(d) impedance means connected directly across said compensating capacitor and responsive to variations of the voltage thereacross;
(e) a feedback circuit coupled between said impedance means and said field winding; and
(f) rectifier means included in said feedback circuit for impressing on said field winding a direct current which increases with a decrease of the load impedance.

8. A control system for an inductor alternator comprising:

(a) an inductor alternator having an armature winding and a field winding;
(b) a substantially resistive load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) inductive means coupled across said armature winding for sensing voltage variations across said armature winding in response to load impedance variations; and
(e) a feedback circuit coupled between said inductive means and said field winding and including rectifier means for impressing a direct current on said field winding which varies in response to voltage variations across said armature winding with variations of said load impedance, thereby to maintain a predetermined relation between variations of said load impedance and variations of the armature winding voltage.

9. A control system for an inductor alternator comprising:

(a) an inductor alternator having an armature winding and a field winding;
(b) a load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) inductive means coupled directly across said compensating capacitor for sensing voltage variations across said capacitor in response to load impedance variations; and
(e) a feedback circuit coupled between said inductive means and said field winding and including rectifier means for impressing a direct current on said field winding which varies with variations of said load impedance thereby to maintain a predetermined relation between variations of said load impedance and variations of the armature winding voltage.

10. A control system for regulating the output voltage of an inductor alternator under varying load impedance conditions comprising:

(a) an inductor alternator having an armature winding and a field winding, said armature winding providing a first reactance element;
(b) a substantially resistive load;
(c) a compensating capacitor connected in series between said armature winding and said load, said compensating capacitor providing a second reactance element, the reactance of said compensating capacitor at the operating frequency of said alternator being no more than the reactance of said armature winding at said operating frequency;
(d) a transformer having a primary winding and a secondary winding, said primary winding being connected across one of said reactance elements and responsive to variations of the voltage across said one of said reactance elements;
(e) a feedback circuit coupled between said secondary winding and said field winding;
(f) rectifier means included in said feedback circuit for impressing on said field winding a direct current which increases with a decrease of the impedance of said load; and
(g) a tuning capacitor connected across said secondary winding, said tuning capacitor and secondary winding forming a parallel resonant circuit having a resonant frequency lower than the operating frequency of said alternator.

11. A control system for regulating the output voltage of an inductor alternator under varying load impedance conditions comprising:

(a) an inductor alternator having an armature winding and a field winding, said armature winding providing a first reactance element;
(b) a load;

(c) a compensating capacitor connected in series between said armature winding and said load, said compensating capacitor providing a second reactance element, the reactance of said compensating capacitor at the operating frequency of said alternator being no more than the reactance of said armature winding at said operating frequency;

(d) a transformer having a primary winding and a secondary winding, said primary winding being connected across one of said reactance elements and responsive to variations of the voltage across said one of said reactance elements;

(e) said tranformer having a laminated U-core and said winding being disposed on adjacent legs thereof;

(f) a feedback circuit coupled between said secondary winding and said field winding; and (g) rectifier means included in said feedback circuit for impressing on said field winding a direct current which increases with a decrease of the impedance of said load.

12. A control system for regulating the output voltage of an inductor alternator under varying load impedance conditions comprising:

(a) an inductor alternator having an armature winding and a field winding, said armature winding providing a first reactance element;

(b) a load;

(c) a compensating capacitor connected in series between said armature winding and said load, said compensating capacitor providing a second reactance element, the reactance of said compensating capacitor at the operating frequency of said alternator being no more than the reactance of said armature winding at said operating frequency;

(b) a transformer having a primary winding and a secondary winding, said primary winding being connected across one of said reactance elements and responsive to variations of the voltage across said one of said reactance elements;

(e) said transformer having a laminated E-I core;

(f) a feedback circuit coupled between said secondary winding and said field winding; and (g) rectifier means included in said feedback circuit for impressing on said field winding a direct current which increases with a decrease of the impedance of said load.

13. A control system for regulating the output voltage of an inductor alternator under varying load impedance conditions comprising:

(a) an inductor alternator having an armature winding and a field winding, said armature winding providing a first reactance element;

(b) a substantially resistive load;

(c) a compensating capacitor connected in series between said armature winding and said load, said compensating capacitor providing a second reactance element, the reactance of said compensating capacitor at the operating frequency of said alternator being no more than the reactance of said armature winding at said operating frequency;

(d) a transformer having a primary winding and a secondary winding, said primary winding being connected across one of said reactance elements and responsive to variations of the voltage across said one of said reactance elements;

(e) said transformer having a bar-core;

(f) a feedback circuit coupled between said secondary winding and said field winding; and (g) rectifier means included in said feedback circuit for impressing on said field winding a direct current which increases in response to voltage variations across said one of said reactance elements with a decrease of the impedance of said load.

14. A control system for an inductor alternator comprising:

(a) an inductor alternator having an armature winding and a field winding;

(b) a load;

(c) a compensating capacitor connected serially with said field winding and said load, said capacitor having a reactance at the operating frequency of said alternator which is no greater than the reactance of said armature winding at said operating frequency, whereby said load sees an inductive or resistive impedance;

(d) a transformer having a primary winding, a secondary winding and a tertiary winding, said primary winding being connected across said load, said tertiary winding being connected across said armature winding for sensing voltage variations across said armature winding and across said load in response to load impedance variations; and (e) a feedback circuit coupled between said secondary winding and said field winding and including rectifier means for impressing a direct current on said field winding which varies with variations of said load impedance, thereby to maintain a predetermined relation between variations of said load impedance and variations of the voltage across said load.

15. A control system for an inductor alternator comprising:

(a) an inductor alternator having an armature winding and a field winding;

(b) a load;

(c) a compensating capacitor connected serially with said field winding and said load, said capacitor having a reactance at the operating frequency of said alternator which is no greater than the reactance of said armature winding at said operating frequency, whereby said load sees an inductive or resistive impedance;

(d) a transformer having a primary winding, a secondary winding and a teritiary winding, said primary winding being connected across said load, said tertiary winding being connected across said armature winding for sensing voltage variations across said armature winding and across said load in response to load impedance variations;

(e) a feedback circuit coupled between said secondary winding and said field winding; and (f) full-wave rectifier and filter means included in said feedback circuit for impressing a direct current on said field winding which varies with variations of said load impedance thereby to maintain a predetermined relation between variations of said load impedance and variations of the voltage across said load.

16. A control system for an inductor alternator comprising:

(a) an inductor alternator having an armature winding and a field winding;

(b) a load;

(c) a compensating capacitor connected serially with said field winding and said load, said capacitor having a reactance at the operating frequency of said alternator which is no greater than the reactance of said armature winding at said operating frequency, whereby said load sees an inductive or resistive impedance;

(d) a transformer having a primary winding, a secondary winding and a tertiary winding, said primary winding being connected across said load, said tertiary winding being connected across said armature winding for sensing voltage variations across said armature winding and across said load in response to load impedance variations;

(e) a tuning capacitor connected across said secondary winding and forming therewith a parallel resonant circuit having a resonant frequency less than the operating frequency of said alternator; and (f) a feedback circuit coupled between said secondary winding and said field winding and including rectifier means for impressing a direct current on said field winding which varies with variations of said load impedance, thereby to maintain a predetermined relation between variations of said load impedance and variations of the voltage across said load.

17. A control system for an inductor alternator comprising:
(a) an inductor alternator having an armature winding and a field winding;
(b) a load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) a transformer having a primary winding, a secondary winding and a tertiary winding, said primary winding being connected across said load, said tertiary winding being connected across said compensating capacitor for sensing voltage variations across said load and across said compensating capacitor in response to load impedance variations; and
(e) a feedback coupled between said secondary winding and said field winding and including rectifier means for impressing a direct current on said field winding which varies with variations of said load impedance, thereby to maintain a predetermined relation between variations of said load and variations of the voltage across said load.

18. A control system for an inductor alternator comprising:
(a) an inductor alternator having an armature winding and a field winding;
(b) a load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) a transformer having a primary winding, a secondary winding and a tertiary winding, said primary winding being connected across said load, said tertiary winding being connected across said compensating capacitor for sensing voltage variations across said load and across said compensating capacitor in response to load impedance variaitons;
(e) a feedback circuit coupled between said secondary winding and said field winding; and
(f) full-wave rectifier and filter means included in said feedback circuit for impressing a direct current on said field winding which varies with variations of said load impedance, thereby to maintain a predetermined relation between variation of said load and variations of the voltage across said load.

19. A control system for an inductor alternator comprising:
(a) an inductor alternator having an armature winding and a field winding;
(b) a load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) a transformer having a primary winding, a secondary winding and a tertiary winding, said primary winding being connected across said load, said tertiary winding being connected across said compensating capacitor for sensing voltage variations across said load and across said compensating capacitor in response to load impedance variations;
(e) a tuning capacitor connected across said secondary winding and forming therewith a parallel resonant circuit having a resonant frequency of less than the operating frequency of said alternator; and
(f) a feedback circuit coupled between said secondary winding and said field winding and including rectifier means for impressing a direct current on said field winding which varies with variations of said load impedance, thereby to maintain a predetermined relation between variations of said load and variations of the voltage across said load.

20. A control system for an inductor alternator comprising:
(a) an inductor alternator having an armature winding and a field winding;
(b) a substantially resistive load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) a transformer having a primary winding and a secondary winding, said primary winding being connected across said armature winding for sensing voltage variations across said armature winding in response to load variations; and
(e) a feedback circuit coupled between said secondary winding and said field winding and including rectifier means for impressing a direct current on said field winding which varies in response to voltage variations across said armature winding with variations of said load impedance, thereby to maintain a predetermined relation between variations of said load impedance and variations of the voltage across said load.

21. A control system for an inductor alternator comprising:
(a) an inductor alternator having an armature winding and a field winding;
(b) a substantially resistive load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;
(d) a transformer having a primary winding and a secondary winding, said primary winding being connected across said armature winding for sensing voltage variations across said armature winding in response to load variations;
(e) a feedback circuit coupled between said secondary winding and said field winding; and
(f) full-wave rectifier and filter means included in said feedback circuit for impressing a direct current on said field winding which varies in response to voltage variations across said armature winding with variations of said load impedance, thereby to maintain a predetermined relation between variations of said load impedance and variations of the voltage across said load.

22. A control system for an inductor alternator comprising:
(a) an inductor alternator having an armature winding and a field winding;
(b) a substantially resistive load;
(c) a compensating capacitor connected serially with said field winding and said load, said capacitor having a reactance at the operating frequency of said alternator which is no greater than the reactance of said armature winding at said operating frequency, whereby said load sees an inductive or resistive impedance;

(d) a transformer having a primary winding and a secondary winding, said primary winding being connected across said armature winding for sensing voltage variations across said armature winding in response to load variations;

(e) a tuning capacitor connected across said secondary winding and forming therewith a parallel resonant circuit having a resonant frequency less than the operating frequency of said alternator; and (f) a feedback circuit coupled between said secondary winding and said field winding and including rectifier means for impressing a direct current on said field winding which varies with variations of said load impedance, thereby to maintain a predetermined relation between variations of said load impedance and variations of the voltage across said load.

23. A control system for an inductor alternator comprising:

(a) an inductor alternator having an armature winding and a field winding;

(b) a load;

(c) a compensating capacitor connected serially with said field winding and said load, said capacitor having a reactance at the operating frequency of said alternator which is no greater than the reactance of said armature winding at said operating frequency, whereby said load sees an inductive or resistive impedance;

(d) a transformer having a primary winding and a secondary winding, said primary winding being connected across said armature winding for sensing voltage variations across said armature winding in response to load variations;

(e) a feedback circuit coupled between said secondary winding and said field winding and including rectifier means for impressing a direct current on said field winding which varies with variations of said load impedance, thereby to maintain a predetermined relation between variations of said load impedance and variations of the voltage across said load;

(f) an auxiliary generator for exciting said alternator and including magnet means rotatable with said alternator;

(g) a fixed magnetic circuit including a generator coil connected across said field winding; and (h) a rectifier serially connected with said generator coil and field winding and poled so as to be blocked by the voltage developed by said feedback circuit and rectifier means after excitation of said alternator.

References Cited by the Examiner
UNITED STATES PATENTS
2,689,327  9/54  Haas ---------------- 322—95
FOREIGN PATENTS
355,157  8/31  Great Britain.

LLOYD McCOLLUM, *Primary Examiner.*

UNITED STATES PATENT OFFICE
CERTIFICATE OF CORRECTION

Patent No. 3,204,173                        August 31, 1965

Robert Vernon Jackson

It is hereby certified that error appears in the above numbered patent requiring correction and that the said Letters Patent should read as corrected below.

Column 2, line 6, for "perimts" read -- permits --; column 3, line 25, strike out "and", first occurrence; column 7, line 68, after "may" insert -- now --; column 10, line 67, for "fedback" read -- feedback --; column 15, line 29, before "coupled" insert -- circuit --; line 61, for "variation" read -- variations --.

Signed and sealed this 22nd day of March 1966.

(SEAL)
Attest:

ERNEST W. SWIDER
Attesting Officer

EDWARD J. BRENNER
Commissioner of Patents